United States Patent Office 3,641,166

Patented Feb. 8, 1972

3,641,166
PROCESS FOR PREPARING 3,5-DIMETHYL-PHENOL FROM ISOPHORONE

Karl Rühl, Duisburg-Meiderich, Heinz-Gerhard Franck, Sudring, and Johannes Turowski, Castrop-Rauxel, Germany, assignors to Rutgerswerke Aktiengesellschaft, Frankfurt am Main, Germany No Drawing. Filed June 26, 1969, Ser. No. 836,984
Claims priority, application Germany, July 10, 1968, P 17 68 875.4
Int. Cl. C07c *37/06*
U.S. Cl. 260—621 R 3 Claims

ABSTRACT OF THE DISCLOSURE

According to the invention 3,5-dimethylphenol is prepared by catalytic conversion of isophorone in the gaseous phase at temperatures in the range of 450–600° C., in the presence of a catalyst consisting of a chromium-nickel-steel alloy of the 18/8 type which contains about 74% of iron, 18% of chromium and 8% of nickel. The 3,5-dimethylphenol is obtained e.g. in a yield of 65–68% by weight. No deposits of carbon are formed on the catalyst and the activity of the catalyst remains constant for a practically unlimited period of time.

This invention relates to a process for preparing 3,5-dimethylphenol by catalytic conversion of isophorone in the gaseous phase. It has been known to convert isophorone in the gaseous phase to 3,5-dimethylphenol, in the presence of catalysts consisting of activated $Al_2O_3$ containing admixtures of e.g. $Fe_2O_3$ (see British Pat. No. 588,-099, Dutch Pat. No. 65,284 and Dutch Pat. No. 65,288). The yields obtainable in these known processes amount to about 50%. However, these processes have the essential disadvantage, that on account of strong formation of coke deposits, occurring in said processes, it is necessary to regenerate the $Al_2O$ catalysts after a few hours of use.

The main object of the present invention is to find a catalyst which can be used without the occurrence of said disadvantage and produces invariably good yields without the necessity of regeneration.

It has now been found that isophorone can be converted by catalytic conversion in the gaseous phase, into 3,5-dimethylphenol without formation of coke deposits on the catalyst with invariable good yields, if the reaction is carried out in the temperature range of 450–600° C., in using as catalyst a chromium-nickel-steel alloy of the 18/8 type which consists of about 74% of iron, about 18% of chromium, and about 8% of nickel. It has been found that under these conditions in a reaction period of 120–150 seconds, the yields of 3,5-dimethylphenol are surprisingly favorable. Depending on the temperature and pressure in the process, variable amounts of mesitylene are simultaneously obtained in the process of the invention.

In contrast to processes, in which catalysts containing $Al_2O_3$ are used, regeneration of the catalyst of the present invention is not necessary, because no coke deposits are formed. It has been found that after a running time of 135 hours, the catalyst still had the same reactivity as at the start of the reaction. In order to supervise the reactivity of the catalyst used, in a test conducted for more than 135 hours, after each period of 27 hours the reaction product of the process was analyzed. As shown by the following table, the effect or reactivity of the catalyst was unchanged for a practically unlimited period of time.

| Period of time, hours | Yield of (percent)— | |
|---|---|---|
| | 3,5-dimethylphenol | Mesitylene |
| 27 | 64.8 | 6.2 |
| 54 | 65.0 | 8.4 |
| 81 | 68.0 | 8.8 |
| 108 | 64.3 | 7.6 |
| 135 | 65.0 | 7.6 |

As the process of the present invention is carried out in the vapor phase and t he isophorone must be kept during a predetermined period of time at the reaction temperature, the process is preferably carried out continuously.

The isophorone is reacted without the use of a diluting agent, can be brought to the reaction temperature either by heating in a pre-evaporator or it can be vaporized in the front part of the reaction space, e.g. a tube. It is then conducted at the reaction temperature and with the desired time of stay through the catalyst zone. The process can be carried out at any desired pressure.

The following examples, to which the invention is not limited illustrate some best modes for carrying out the invention.

EXAMPLE 1

50 ml.=46.5 g. isophorone are passed per hour through a tube consisting of the above-described chromium-nickel-steel alloy of the 18/8 type which is filled with 3 x 3 mm. filling bodies consisting of the same alloy and has a capacity of 1180 ml. at a temperature of 575° C. The period of stay in the reaction space amounted to 135 seconds and the process was continued for 4 hours. 80.4% of the isophorone introduced into the process were obtained as reaction product and 19.6% of the charge were lost. After the end of the reaction, the reaction mixture was extracted in conventional manner, by mixing it with 1.5 liter of sodium hydroxide solution of 10%. The bulk of the neutral oil was separated in a separating funnel. The residual neutral oil was separated by distillation with steam. Subsequently, the 3,5-dimethylphenol was precipitated by the addition of 150 ml. of sulfuric acid of 66%. The crude 3,5-dimethylphenol thus obtained was neutralized with a sodium carbonate solution of 20%, washed with water and then distilled. The product of catalysis consisted of 68% of acid oils and 32% of neutral oil.

Gas-chromatographic analysis of the acid oils gave the following results:

| | Percent by wt. |
|---|---|
| m-/p-Cresol | 2.5 |
| 2,4/2,5-xylenol | 0.8 |
| 3,5-xylenol | 96.7 |
| | 100.0 |

Gas-chromatographic analysis of the neutral oil gave the following results:

| | Percent |
|---|---|
| Light constituents | 7.7 |
| Toluene | 9.4 |
| m-/p-Xylene | 7.5 |
| o-Xylene | 1.0 |
| Mesitylene | 21.6 |
| Isophorone | 52.8 |
| | 100.0 |

EXAMPLE 2

Through a 4 liter pressure tube consisting of the above described chromium-nickel-steel alloy of the 18/8 type, filled with 3 x 3 mm. filling bodies consisting of the same alloy, at 550° C. and 25 atmospheres excess pressure, 4.65 kg. of isophorone were passed per hour. The period of stay in the reaction space amounted to 135 seconds, and the process was carried out for 4 hours. After the end of the reaction the resulting reaction mixture was processed in the manner described in the above Example 1. 72.5% of the isophorone introduced into the reaction where obtained as catalytically reacted product and 27.5% of the charge were lost. The catalytically reacted product consisted of 87.5% of acid oils and 12.5% of neutral oil.

The gas-chromatographic analysis of the acid oils gave the following results:

| | Percent |
|---|---|
| m-/p-Cresol | 1.00 |
| 2,4/2,5-xylenol | 1.40 |
| 3,5-xylenol | 96.70 |
| Not identified | 0.90 |
| | 100.00 |

Gas-chromatographic analysis of the neutral oil gave the following results:

| | Percent |
|---|---|
| Light constituents | 7.3 |
| Toluene | 5.9 |
| m-/p-Xylene | 14.1 |
| o-Xylene | 1.5 |
| Mesitylene | 33.9 |
| Isophorone | 31.2 |
| Not identified | 6.1 |
| | 100.0 |

The above described 27–135 hours test was carried out with a catalyst consisting of 74% of iron, 18% of chromium and 8% of nickel, at a temperature of 575° C. at ordinary atmospheric pressure in the manner described in the above Example 1. In said Example 1 the reaction is carried out under ordinary atmospheric pressure. However, as mentioned above, the claimed process can be carried out at any desired pressure for example under ordinary atmospheric pressure, or at a pressure in the range of 25 to 100 atmospheres superatmospheric pressure. The catalyst used in the above Examples 1 and 2 consisted of 74% of iron, 18% of chromium and 8% of nickel. The solutions of sodium hydroxide and sodium carbonate mentioned in the above examples are aqueous solutions. The term "period of stay" used above refers to the period, during which the substance to be converted is in contact with the catalyst in the reaction space. The tube used in the above Example 1 is, for example, a cylindrical tube made of the chromium-nickel-steel alloy of the 18/8 type having a thickness of wall of 19 mm., an inner diameter of 52 mm. and a length of about 200 cm. The filling bodies used in the tube may be so called "dixon bodies" having a cylindrical structure of stainless steel wire. The "pressure tube" used in Example 2 must be, of course, resistant to increased pressure. The percents mentioned herein are by weight, if not otherwise stated. The yields mentioned are percent by weight, based on the weight of the isophorone charged.

What is claimed is:

1. A process for producing 3,5-dimethylphenol by catalytic conversioin of isophorone in the gaseous phase, in which the rearrangement is brought about by heating isophorone in the gaseous phase in the temperature range of 450–600° C. in the presence of a chromium-nickel-steel alloy catalyst, said alloy catalyst consisting of about 74% by weight of iron, about 18% by weight of chromium and about 8% by weight of nickel.

2. A process as claimed in claim 1, in which conversion is brought about under ordinary atmospheric pressure.

3. A process as claimed in claim 1, in which conversion is brought about under superatmospheric pressure.

References Cited

UNITED STATES PATENTS

| | | | |
|---|---|---|---|
| 2,369,197 | 2/1945 | Winkler et al. | 260—621 R |
| 2,413,598 | 12/1946 | Ballard et al. | 260—621 R X |
| 2,506,226 | 5/1950 | Layng | 252—470 |
| 3,385,902 | 5/1968 | Bright et al. | 260—621 H |

FOREIGN PATENTS

| | | | |
|---|---|---|---|
| 584,256 | 1/1947 | Great Britain | 260—621 R |

OTHER REFERENCES

Horning, "Chem. Abstract," vol. 39, p. 4851[4], (1945).

LEON ZITVER, Primary Examiner

N. P. MORGENSTERN, Assistant Examiner

U.S. Cl. X.R.

252—470; 260—668 R